United States Patent
Konishi et al.

(10) Patent No.: US 7,068,585 B2
(45) Date of Patent: Jun. 27, 2006

(54) OPTICAL INFORMATION RECORDING MEDIUM

(75) Inventors: Hiroshi Konishi, Tokyo (JP); Seiji Morita, Yokohama (JP)

(73) Assignee: Nikon Corporation, Tokyo (JP)

( * ) Notice: Subject to any disclaimer, the term of this patent is extended or adjusted under 35 U.S.C. 154(b) by 381 days.

(21) Appl. No.: 10/406,444

(22) Filed: Apr. 4, 2003

(65) Prior Publication Data

US 2003/0169676 A1 Sep. 11, 2003

Related U.S. Application Data

(63) Continuation of application No. PCT/JP01/09737, filed on Nov. 7, 2001.

(30) Foreign Application Priority Data

Nov. 13, 2000 (JP) ........................................ 2000-344686

(51) Int. Cl.
*G11B 7/24* (2006.01)

(52) U.S. Cl. ................................ 369/275.3; 369/275.4; 369/44.13

(58) Field of Classification Search ............. 369/275.3, 369/275.4, 275.1, 275.2, 275.5, 47.22, 47.35, 369/47.48, 47.17, 47.18, 44.13, 44.26, 53.29, 369/277, 278, 279, 280

See application file for complete search history.

(56) References Cited

U.S. PATENT DOCUMENTS

| | | | | |
|---|---|---|---|---|
| 6,128,270 A | * | 10/2000 | Nishikawa | ............... 369/275.4 |
| 6,167,013 A | * | 12/2000 | Ando et al. | ............... 369/53.23 |
| 6,282,166 B1 | * | 8/2001 | Akiyama et al. | ......... 319/275.3 |
| 6,487,147 B1 | * | 11/2002 | Miyagawa et al. | ...... 369/44.26 |

FOREIGN PATENT DOCUMENTS

WO     WO 02/39441 A1     11/2001

* cited by examiner

*Primary Examiner*—Ali Neyzari
(74) *Attorney, Agent, or Firm*—Morgan Lewis & Bockius LLP

(57) ABSTRACT

In a DVD-R, lands 1 and grooves 2 are alternately formed in a spiral configuration; the lands 1 form projecting parts, and the grooves 2 form recessed parts 2. Recorded information is written into the grooves 2, while land pre-pits 3 are formed in some portions of the lands 1. The land pre-pits 3 form recessed parts, and the respective land pre-pits 3 cover the entire width of the corresponding land 1 as shown in the figures. These land pre-pits 3 are arranged so that $a > b > 0.5 \times a$, where a is the maximum length of the land pre-pits, and b is the minimum length (ordinarily, the minimum length is the shorter of the lengths b1 and b2 of the land pre-pits in the circumferential edge portions of the lands (i.e., the boundary portions with the grooves)). Furthermore, the value of a is set at 0.2 μm to 0.4 μm.

2 Claims, 4 Drawing Sheets

(A)

(B)

OPTICAL INFORMATION RECORDING MEDIUM

The present application is a continuation of PCT/JP01/09737 filed Nov. 7, 2001 which was published as WO 02/39441 A1 on May 16, 2002 in the Japanese lauguage.

TECHNICAL FIELD

The present invention relates to an optical information-recording medium as typified by a DVD-R or DVD-RW, etc.

BACKGROUND ART

Optical information recording media such as optical discs and optical-magnetic discs have been widely used in the past as data recording media and audio information recording media. In recent years, CD-R, CD-RW, DVD-R and DVD-RW, etc., have also begun to be used in addition to such optical information recording media. In these optical information recording media, variations in reflectivity caused by marks such as fine pits formed in the surface of a disc-form recording medium, or variations in characteristics caused by the different magnetic marks recorded on the magnetic film formed on the surface of such a disc-form recording medium, are utilized as information, and the recording of information is accomplished by utilizing optical means.

In regard to the meanings of technical terms relating to optical information recording media that use such systems, some of these terms are described in JISX6261 "130 mm Writable Optical Disc Cartridges" and JISX6271 "130 mm Rewritable Optical Disc Cartridges"; accordingly, in the present specification, the technical terms described in these publications will be used in the senses described in these publications unless otherwise noted.

In these optical information recording media, meandering grooves and lands are alternately formed in a spiral pattern, and information is ordinarily written in the grooves. Furthermore, the grooves and lands are used for position control, i.e., position detection for the purpose of tracking, which causes the pickup of the recording device or playback device to run along the zone in which information is written. Specifically, since the intensity of the reflected light varies according to the position of the groove or land that corresponds to the position illuminated with light, a control action is performed in which the recording device or playback device receives the signal, and the position of the pickup is controlled so that the positions in which information is written are accurately illuminated with light.

Furthermore, among these optical information recording media, a standard known as the "DVD book" has been established in the case of recordable DVD (DVD-R, DVD-RW). According to this standard, pre-embossed pits known as "land pre-pits (LPP)" are regularly arranged in the land parts adjacent to the spiral-form meandering grooves of the disc-form optical information recording medium (hereafter referred to simply as a "disc" in some cases).

Control information, etc., such as disc address information, disc manufacturer information and disc writing information, which is sent to the recording device or playback device, etc., when information is recorded on the optical information recording medium or when information is read out from the optical information recording medium is embedded beforehand in the land pre-pits.

At the same time that the recording and playback device records or plays back information in the groove regions of the DVD-R disc or DVD-RW disc while tracking these groove regions by means of a light spot, the recording and playback device also plays back the land pre-pit signals from the adjacent land and thus acquires necessary information. For example, in the case of a DVD-R disc, recording marks are written with a light spot while the grooves are tracked during recording; at the same time, address information, etc., of the land pre-pits is played back. Furthermore, in cases where a recorded DVD-R disc is played back by the recording and playback device, the adjacent land pre-pits are played back while the pits that have been recorded in the groove region are played back.

The length itself of the land pre-pits that are formed is not fixed by any standard; however, especially in cases where it is necessary to play back land pre-pits during recording, a certain minimum strength is required by standards for the signal strength during land pre-pit playback. Meanwhile, in the case of DVD-R and DVD-RW discs, the length of the marks that are recorded is fixed at 0.4 µm for the minimum mark length by the DVD Book standard. However, in the case of DVD-R and DVD-RW discs, a system is used in which the address information of the land pre-pits is played back while recorded marks written in the grooves are played back; accordingly, in cases where regions in which minimum marks of 0.4 µm are written are played back, there is a danger that the minimum mark playback signals and land pre-pit playback signals will interfere with each other if the length of the land pre-pit signals is 0.4 µm or greater. As a result, it has been found that this causes problems in terms of an increase in recorded mark jitter and an increase in the error rate.

Furthermore, in cases where marks that are longer than the minimum marks are played back as well, the marks are recognized as being longer than the marks that are actually written because of interference with the land pre-pit signals; as a result it has similarly been found that this leads to problems in terms of an increase in jitter and an increase in the error rate.

In the case of DVD-R and DVD-RW discs, as was described above, the formation of the land pre-pits with an optimal length and shape is extremely important when these land pre-pits are played back by the recording and playback device.

Meanwhile, if the stability of the land pre-pit playback signal quality is taken into account, it is desirable that the respective land pre-pits completely cover the width of the lands, and that the ratio of the minimum value of the length to the maximum value of the length be equal to or greater than a specified value. If there are portions in which land pre-pits are not formed in the direction of width of the lands, this will cause variation in the read-out signal strength of the land pre-pits, thus leading to a drop in the signal quality. Similarly, if the ratio of the minimum value of the length of the land pre-pits (0 in a case where there are portions in which land pre-pits are not formed in the direction of width of the lands) to the maximum value of this length is less than a specified value, this results in variation in the read-out signal strength of the land pre-pits, thus leading to a drop in the signal quality.

However, it has been found that such shortening the length of the land pre-pits in order to prevent an increase in recorded mark jitter and an increase in the error rate, covering the entire width of the lands with the respective land pre-pits in order to achieve stability of the land pre-pit signals, and devising the system so that the ratio of the minimum value of the length to the maximum value of the length is a specified value or greater, are in a trade-off relationship if conventional techniques are used, so that these objectives cannot be simultaneously achieved.

Specifically, in the case of optical discs such as DVD-R and DVD-RW, substrate duplication is performed from a mold called a stamper via an injection molding process. The land pre-pits are also formed by a master plate for stamper exposure process in the stamper manufacturing process.

In this master plate for stamper exposure process, the light spot of the laser cutting machine has a circular shape; accordingly, the shape of the land pre-pits is also circular. Consequently, if this diameter is increased in order to increase the land pre-pit signal strength, the land pre-pits cover the entire width of the lands, and the ratio of the minimum value of the length to the maximum value of the length is increased, so that the land pre-pit signal quality is increased; however, the length of the land pre-pits is also correspondingly increased, so that the land pre-pits interfere with the marks recorded in the grooves, thus lowering the quality of the recorded mark playback signal.

Conversely, if the length of the land pre-pits is shortened in order to improve the recorded mark playback signal quality, the respective land pre-pits cannot cover the entire width of the lands since the light spot that is used to form the land pre-pits is circular. Furthermore, the ratio of the minimum value of the length to the maximum value of the length is reduced, thus causing a drop in the land pre-pit signal strength.

DISCLOSURE OF THE INVENTION

The present invention was devised in light of such facts; the object of the present invention is to provide an optical information recording medium which makes it possible to maintain the land pre-pit playback signal strength at a high level so that detection of the land pre-pits can be reliably accomplished, without lowering the playback signal quality of the recorded marks, and to provide a stamper which is used to manufacture this optical information recording medium.

The first invention of the present application which is used to achieve the above-mentioned object is a disc-form optical information recording medium which has meandering grooves and lands and in which the recording and playback of information are performed by means of a light beam which tracks on the above-mentioned grooves, this optical information recording medium further having embossed pits (land pre-pits) that are formed in the lands beforehand, wherein the maximum length a in a above-mentioned land pre-pit is 0.4 μm or less for all above-mentioned land pre-pits, and the relationship between this maximum length a and the minimum length b of the same land pre-pit is such that a>b>0.5×a for all land pre-pits.

Experiments conducted by the inventors have demonstrated that in cases where minimum marks of 0.4 μm stipulated by the DVD Book standard are handled, it is desirable that the maximum length of the land pre-pits be 0.4 μm or less in order to prevent an increase in the jitter of signals recorded in the grooves and an increase in the error rate. In this present invention, therefore, the length of the land pre-pits is limited to this range.

Specifically, if the maximum length of the land pre-pits exceeds 0.4 μm, the mark playback signals and land pre-pit playback signals will interfere with each other when the minimum marks (0.4 μm) recorded in the grooves are played back, so that there is a danger of an increase in the jitter of the recorded marks and an increase in the error rate. The lower limit of the maximum length of the land pre-pits is not particularly stipulated; however, if this length is too small, the pre-pit signals are reduced, so that the error rate increases, and so that it becomes difficult to manufacture the medium using a lithographic process. Accordingly, assuming that current technology is used, it is desirable to set 0.2 μm as the lower limit. According to experiments conducted by the inventors, it is particularly desirable to set the maximum length of the land pre-pits at 0.3±0.05 μm.

Meanwhile, as was described above, it is desirable that the land pre-pits cover the entire width of the lands. However, as will be described in detail in the embodiments below, it has been found that simply covering the entire width is insufficient, and that unless the minimum width b (ordinarily occurring in the end portions of the lands) is greater than half the maximum length a (ordinarily occurring in the vicinity of the central portions of the lands), stable reading of the land pre-pit signals becomes impossible, so that the read-out error rate increases. Accordingly, in the present invention, the relationship of the above-mentioned a and b is limited as shown in the above-mentioned formula.

By using such a shape, it is possible to output a large land pre-pit signal strength, so that the pre-pit error rate can be suppressed to a small value; furthermore, there is also little error caused by interference with the recorded marks following recording on the medium, and jitter can also be suppressed to a small value.

The second invention of the present application which is used to achieve the above-mentioned object is a stamper which is used to manufacture an optical information recording medium that has meandering grooves and lands, and in which projecting parts used to form predetermined embossed pits (land pre-pits) are present in recesses used to form the lands, wherein the maximum length a in a above-mentioned projecting part is 0.4 μm or less for all above-mentioned projecting parts, and the relationship between this maximum length a and the minimum length b of the same projecting part is such that a>b>0.5×a for all above-mentioned projecting parts.

The present invention is a stamper which is used to manufacture the optical information recording medium constituting the above-mentioned first invention. Accordingly, the size of the projecting parts used to form the land pre-pits are regulated as described above so that the shapes of the various parts stipulated in the optical information recording medium constituting the first invention can be obtained. The present invention allows the mass production of the superior optical information recording medium constituting the above-mentioned first invention.

BEST MODE FOR CARRYING OUT THE INVENTION

Figure 1:
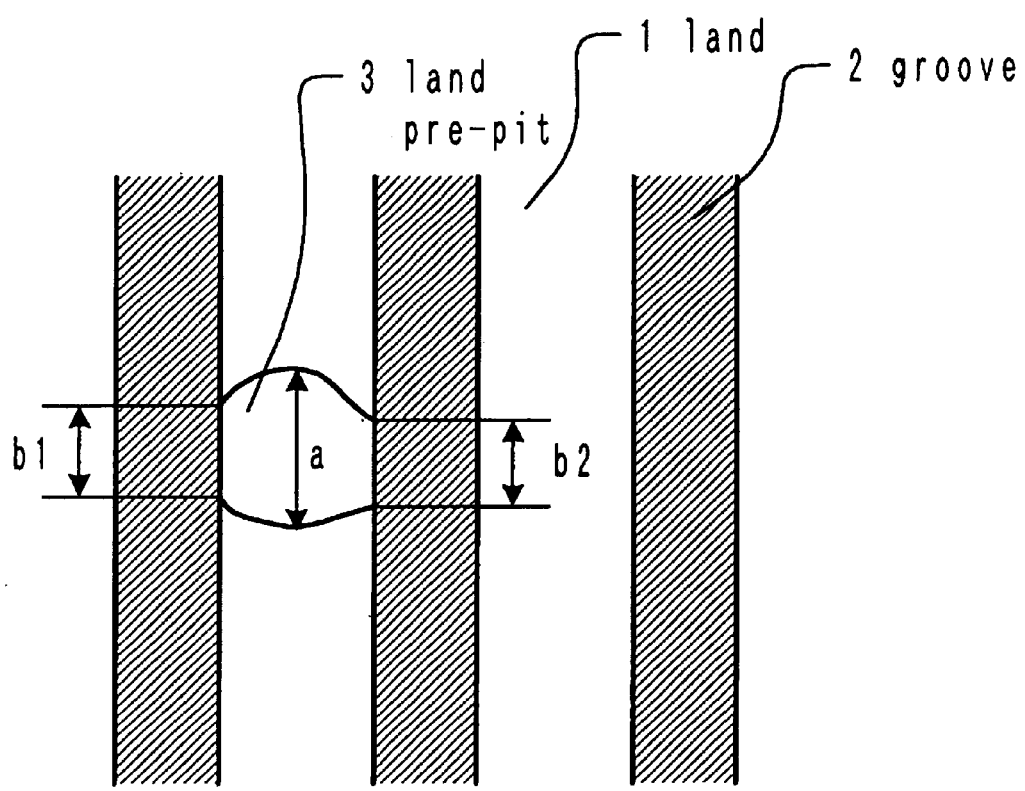
FIG. 1 is a diagram which shows an enlargement of the grooves and lands of a DVD-R disc constituting an embodiment of the present invention.
Figure 4:
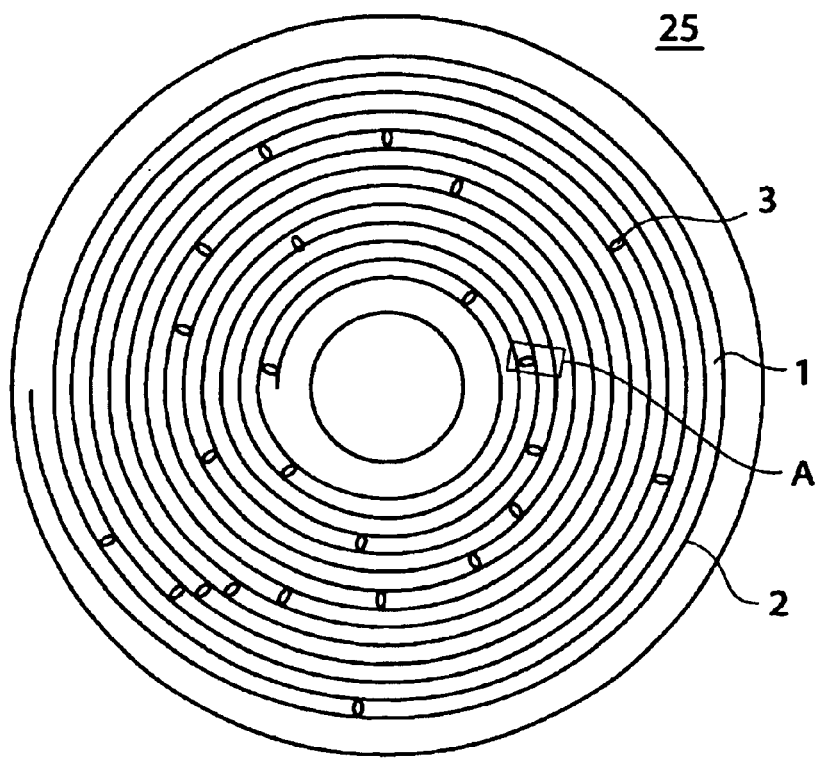
FIG. 4 shows schematic structural diagrams of a DVD-R disc constituting an embodiment of the present invention.
Figure 4:
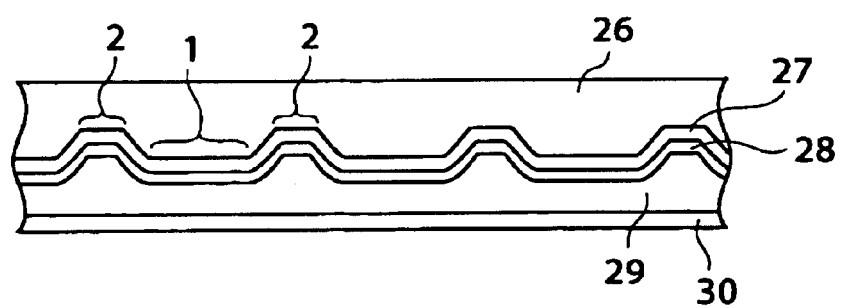

Examples of embodiments of the present invention will be described below with reference to the attached figures. FIG. 4 shows diagrams that illustrate the schematic construction of a DVD-R disc. FIG. 1 is a diagram which shows an enlargement of region A in FIG. 4. In FIGS. 1 and 4, 1 indicates lands, 2 indicates grooves, and 3 indicates land pre-pits.

Furthermore, FIG. 4 (a) is a front view of the DVD-R disc, and FIG. 4 (b) is a schematic sectional view of the DVD-R disc. As is shown in FIG. 4 (b), the DVD-R disc 25 has a structure in which a synthetic resin substrate 26, coloring agent layer 27, reflective film 28, protective layer 29 and adhesive layer 30 are laminated in that order from the side of the pickup. Furthermore, the lands 1 and grooves 2 are alternately formed in a spiral configuration.

When viewed from the side opposite the pickup side, the lands 1 form projecting parts; furthermore, when similarly viewed from the side opposite the pickup side, the grooves 2 form recessed parts. The grooves 2 meander slightly in the direction of diameter, and recorded information is written in these grooves 2. Meanwhile, land pre-pits 3 are formed in the lands 1. In this embodiment of the present invention, the grooves 2 are formed to a depth of 100 to 200 nm relative to the lands 1, and the land pre-pits 3 are also similarly formed to a depth of 100 to 200 nm.

The land pre-pits 3 form recessed parts, and the respective land pre-pits 3 cover the entire width of the lands 1 as shown in FIG. 1. These land pre-pits 3 are arranged so that a>b>0.5×a, where a is the maximum length of the land pre-pits and b is the minimum length (ordinarily, the maximum length appears in the vicinity of the central portions of the lands, and the minimum length is the shorter of the lengths b1 and b2 of the land pre-pits in the circumferential edge portions of the lands (i.e., the boundary portions with the grooves)).

Furthermore, the value of a is set at 0.2 μm to 0.4 μm. As a result, as was described above, an optical information recording medium can be obtained in which the land pre-pit playback signal strength can be maintained at a high level, so that the detection of the land pre-pits can be securely accomplished, without causing any drop in the quality of the playback signal of the recorded marks.

Figure 2:
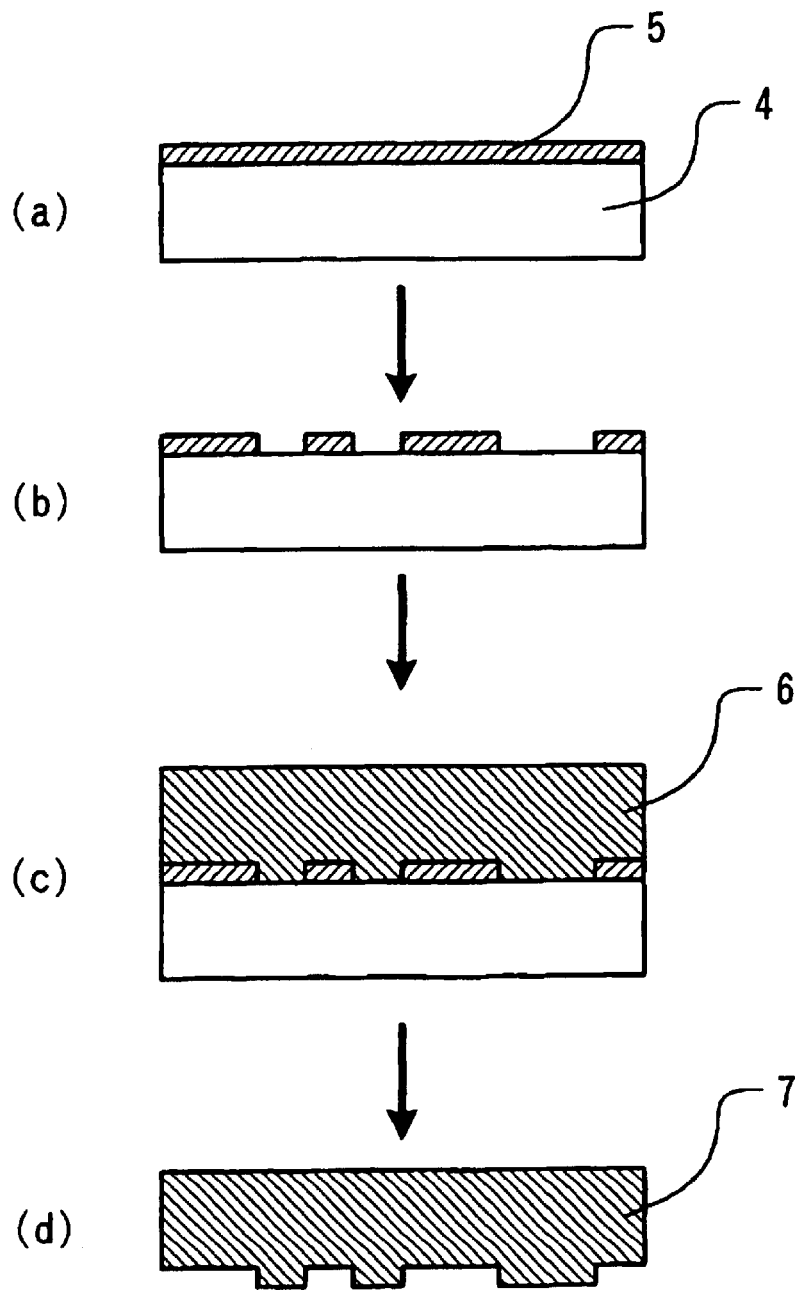
FIG. 2 is a diagram which shows an example of the stamper manufacturing method.

A master plate for stamper manufacturing method constituting one example of an embodiment of the present invention will be described below. Generally, an optical information recording medium is manufactured by first manufacturing a stamper that serves as a mold, and then injection-molding a polycarbonate using this stamper. FIG. 2 is a diagram which shows a stamper manufacturing method; this figure shows a universally known method. In FIG. 2, 4 indicates a substrate, 5 indicates a photoresist layer, 6 indicates a nickel plating layer, and 7 indicates a stamper.

Blue plate glass, quartz, Cu or Si, etc., is used as the substrate material, and this material is worked into a doughnut-form disc, thus producing the substrate 4. Afterward, the surface of the substrate is precisely polished so that the surface roughness Ra is 1 nm or less. Following cleaning, the surface of the substrate is spin-coated with a primer and a photoresist 5 in that order. When this is pre-baked, a photoresist layer 5 with a thickness of approximately 100 to 800 nm is formed on the substrate 4 (a).

Next, the photoresist 5 on the substrate 4 is exposed using a laser cutting machine. The exposure pattern is a pattern that corresponds to the grooves and land pre-pits of the optical information recording medium.

Following exposure, the resists 5 of the substrate 4 are respectively developed with an inorganic alkali developing solution. The resist surfaces are spin-cleaned, and are then subjected to post-baking. As a result, a resist pattern is formed, so that a master plate for stamper is obtained (b).

Next, an Ni layer (conductive layer) is formed on the surface of this master plate for stamper, so that a conduction producing treatment is completed. Then, Ni electro-casting is performed by passing a current through, so that an Ni plating layer 6 of a specified thickness is formed (c). Next, when this Ni plating layer 6 is stripped from the master plate for stamper, a stamper 7 is obtained (d). Besides this method, methods such as those described in Japanese Patent Application Kokai No. H11-333884, Japanese Patent Application Kokai No. H11-333885 and Japanese Patent Application Kokai No. H11-333856 may also be used as the stamper manufacturing method.

In the present embodiment, when exposure is performed by means of a laser cutting machine in the lithographic process described above, a laser cutting machine which has an exposing light spot that differs from that of a conventional device is used. Specifically, the shape of the exposing light spot of this laser cutting machine is a shape which is long in the direction corresponding to the direction of width of the optical information recording medium, and short in the direction that is perpendicular to this (i.e., in the direction corresponding to the direction of length of the grooves and lands).

Figure 3:
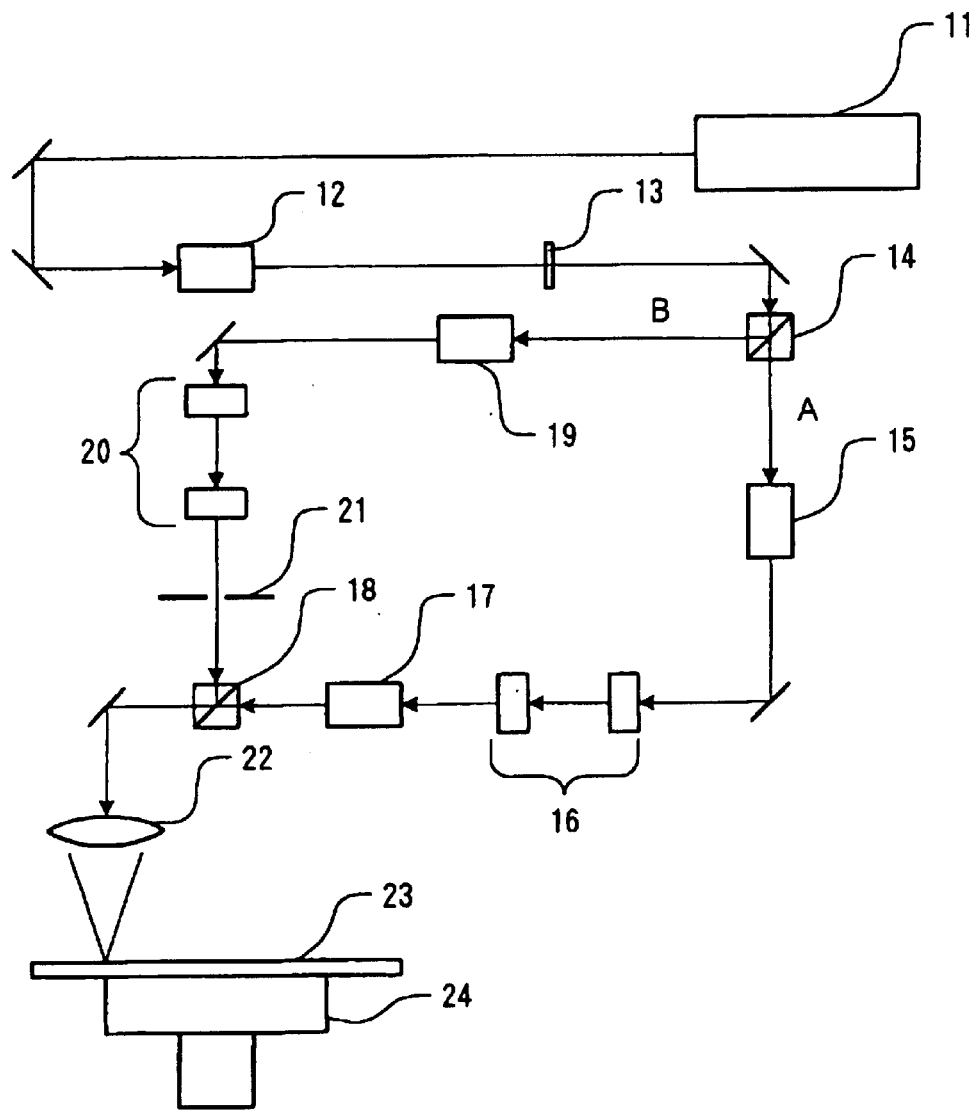
FIG. 3 is a diagram showing the construction of a laser cutting machine.

The construction of an exposure apparatus, i.e., laser cutting machine, constituting one example of an embodiment of the present invention is shown in FIG. 3. In FIG. 3, 11 indicates a laser tube, 12 indicates an AO modulator, 13 indicates a ½-wavelength plate, 14 indicates a polarizing beam splitter, 15 indicates an AO modulator, 16 indicates a beam expander, 17 indicates an EO deflector, 18 indicates a polarizing beam splitter, 19 indicates an AO modulator, 20 indicates a beam expander, 21 indicates a slit aperture, 22 indicates an objective lens, 23 indicates a substrate, and 24 indicates a turntable.

The intensity of the laser light emitted from the laser tube 11 is adjusted by the AO modulator 12; this light passes through the ½-wavelength plate 13, and enters the polarizing beam splitter 14, where the light is divided into two laser paths, i.e., laser path A and laser path B.

The laser light of laser path A is modulated by the AO modulator 15 so that the laser light passes through only when grooves are formed; this light passes through the beam expander 16 and enters the EO deflector 17. The EO deflector 17 deflects the laser light passing through laser path A, and creates a meander (wobble) that is used to record frame information, etc., in the grooves.

The laser light of laser path B is modulated by the AO modulator 19 so that the laser light passes through only when land pre-pits are formed; this light passes through the beam expander 20 and enters the slit aperture 21. The slit aperture 21 is peculiar to this embodiment of the present invention, and converts the circular laser light into laser light with a shape that is long in the direction corresponding to the radial direction of the optical information recording medium and short in the direction that is perpendicular to this radial direction. For example, in a conventional laser cutting machine, a light spot with a diameter of approximately 2 mm is used in laser path B, and illumination is performed with this light spot shaped to a diameter of 1.2 mm by means of a circular aperture. In the present embodiment, however, a rectangular slit aperture 21 is used which has a width of 1.2 mm in the direction corresponding to the direction of length of the lands and a length of 2 mm or greater in the direction corresponding to the direction of width of the lands.

Next, the light that has passed through the slit aperture 21 is focused by means of the objective lens 22, so that the land pre-pit portions are exposed. Furthermore, when the land pre-pit portions are exposed, the dimension of the land pre-pits in the direction of length of the lands varies according to the intensity of the laser light, the rotational speed of the substrate that is being exposed and the exposure time. Therefore, an exposure time that produces an appropriate dimension (length) is determined, and the AO modulator 19 is controlled accordingly.

Furthermore, if a system is used in which exposure is thus performed by focusing the light that passes through a rectangular slit aperture 21, the effective diameter of the spot in the direction of length of the lands is not increased even if the intensity of the laser light is raised to a degree that allows complete exposure of the width of the lands 1. Accordingly, exposure which causes the longest portions of a land pre-pit in the direction of length to exceed a certain ratio relative to the shortest portion of the same land pre-pit can be prevented for all land pre-pits.

As a result, the land pre-pits that are formed completely cover the width of the lands, and the maximum length a of a land pre-pit is 0.4 μm or less, so that the relationship of this maximum length a to the minimum length b of the same land pre-pit can be set so that a>b>0.5×a for all land pre-pits.

The laser light of laser path A and the laser light of laser path B are gathered into a single beam by the polarizing beam splitter 18, and this light is focused by the objective lens 21 on the surface of the rotating substrate 22 that is placed on the turntable 23, so that the resist is exposed to light as described above. In this case, the laser light passing through laser path A and the laser light passing through laser path B are adjusted so that the positions of the respective light beams are slightly shifted by causing the position of the polarizing beam splitter 18 to move in the direction parallel to the plane of the page in FIG. 3; accordingly, the former light exposes the portions that form the grooves, while the latter light exposes the portions that form the land pre-pits.

EXAMPLES

Example 1

A DVD-R disc constructed according to the present invention was manufactured. First, a precisely cleaned glass plate with an external diameter of 200 mm and a thickness of 6 mm was prepared, and the surface of this plate was coated with a primer. Afterward, a positive photoresist (S1818 manufactured by Shipley Co.) was applied by spin-coating, and pre-baking was performed for 10 minutes on a hot plate at 100° C. A coated plate with a coating thickness of 180 nm was completed by means of this process.

Next, the coated plate was placed in a laser cutting machine mounting a Kr laser, and wobbled grooves and land pre-pits were formed. In the case of the present example, a two-beam light path system of the type shown in FIG. 3 was used; the grooves were exposed using laser path A, and the land pre-pits were exposed using, laser path B. Furthermore, in laser path B used to expose the land pre-pits, a slit aperture was inserted at an intermediate point in the light path system, so that the circular beam was converted into an elliptical beam that was long in the radial direction of the optical disc with respect to the focal plane.

During exposure, cutting was performed at a CLV speed of 3.49 m/sec and a track pitch of 0.74 μm. The exposure power was set so that the half-width value of the grooves was 300 nm, and so that the length values of the land pre-pits were a=0.3 μm, b=0.2 μm in FIG. 1.

Then, a master plate was completed by developing the above-mentioned plate using an inorganic alkali developing solution (developer manufactured by Shipley Co.) diluted to a concentration of 20% with ultrapure water. Next, a conduction producing treatment was performed; following electro-casting using a nickel electro-casting apparatus manufactured by Technotrans Co., this cast layer was stripped from the glass master plate for stamper, and a nickel stamper was completed by stamping this cast layer out to an internal diameter of 22.0 mm and an external diameter of 138 mm.

This stamper was set in an injection molding apparatus manufactured by Sumitomo Heavy Industries, Ltd. A poly carbonate substrate with a thickness of 0.6 mm was prepared; then, using the stamper of the present invention in a DVD-R manufacturing line, a plastic disc was completed by applying a cyanine dye by spin-coating, applying an anti-reflection film by sputtering, pasting a protective substrate with a thickness of 0.6 mm to this, and further applying a lacquer coating.

In the present example, a cyanine-type organic dye was used. However, the present invention is of course not limited to this, and may also be applied to a DVD-RW using a phase variation-type metal thin film.

This blank disc was placed in a disc evaluation apparatus DDU-1000 manufactured by Pulstec Industrial Co. Ltd., and the LPP error rate was measured by inputting a push-pull signal not yet recorded or played back into an LPP (land pre-pit) error counter DMR-3330 manufactured by Kenwood. As a result, the LPP error rate was 1.8%.

Next, video data was converted into a format signal, and was recorded on the above-mentioned blank disc using laser light with a wavelength of 650 nm. Then, the disc was similarly placed in a disc evaluation apparatus DDU-1000 manufactured by Pulstec Industrial Co. Ltd., and the LPP strength was measured from the playback push-pull signal by means of an oscilloscope. As a result, the aperture ratio as measured from the voltage value was 20%. The block error rate following recording was measured overall; as a result, a value of 2% was obtained. Furthermore, the jitter of the recorded marks was 7.2%.

Example 2

A DVD-R disc was manufactured by the same method as in Example 1. However, the exposure power was set so that the length values of the land pre-pits were a=0.28 μm, b=0.2 μm in FIG. 1.

This blank disc was placed in a disc evaluation apparatus DDU-1000 manufactured by Pulstec Industrial Co. Ltd., and the LPP error rate was measured by inputting a push-pull signal not yet recorded or played back into an LPP error counter DMR-3330 manufactured by Kenwood. As a result, the LPP error rate was 2.1%.

Next, video data was converted into a format signal, and was recorded on the above-mentioned blank disc using laser light with a wavelength of 650 nm. Then, the disc was placed in a disc evaluation apparatus DDU-1000 manufactured by Pulstec Industrial Co. Ltd., and the LPP strength was measured from the playback push-pull signal by means of an oscilloscope. As a result, the aperture ratio as measured from the voltage value was 20%. The block error rate following recording was measured overall; as a result, a value of 2.5% was obtained. Furthermore, the jitter of the recorded marks was 7.0%.

Comparative Example 1

A DVD-R disc was manufactured by the same method as in Example 1. However, in the laser cutting machine, no slit aperture was inserted into laser path B used to expose the land pre-pits, so that the exposed surface was illuminated with a circular beam. Furthermore, the exposure power was set so that the length values of the land pre-pits were a=0.3 μm, b=0.1 μm in FIG. 1.

This blank disc was placed in a disc evaluation apparatus DDU-1000 manufactured by Pulstec Industrial Co. Ltd., and the LPP error rate was measured by inputting a push-pull signal not yet recorded or played back into an LPP error counter DMR-3330 manufactured by Kenwood. As a result, the LPP error rate was 2.5%.

Next, video data was converted into a format signal, and was recorded on the above-mentioned blank disc using laser light with a wavelength of 650 nm. Then, the disc was similarly placed in a disc evaluation apparatus DDU-1000 manufactured by Pulstec Industrial Co. Ltd., and the LPP strength was measured from the playback push-pull signal by means of an oscilloscope. As a result, the aperture ratio as measured from the voltage value was 14.2%, a value slightly below that of the DVD Book standard.

The block error rate following recording was measured overall; as a result, a value of 3.2% was obtained, thus indicating that there was a deterioration in this value compared to the values obtained in Examples 1 and 2. Furthermore, the jitter of the recorded marks was 7.2%, which was comparable to those obtained in the examples; however, it is inferred that this was due to the fact that there was no pit interference with the recorded marks since the size of the LPP was smaller than in the examples.

Comparative Example 2

A DVD-R disc was manufactured by the same method as in Comparative Example 1. In this case, however, a slit aperture was inserted into laser path B used to expose the land pre-pits, and the exposure power was set so that the length values of the land pre-pits were a=0.45 μm, b=0.25 μm in FIG. 1.

This blank disc was placed in a disc evaluation apparatus DDU-1000 manufactured by Pulstec Industrial Co. Ltd., and the LPP error rate was measured by inputting a push-pull signal not yet recorded or played back into an LPP error counter DMR-3330 manufactured by Kenwood. As a result, the LPP error rate was 1.8%.

Next, the resulting video data was converted into a format signal, and was recorded on the above-mentioned blank disc using laser light with a wavelength of 650 nm. Then, the disc was placed in a disc evaluation apparatus DDU-1000 manufactured by Pulstec Industrial Co. Ltd., and the LPP strength was measured from the playback push-pull signal by means of an oscilloscope. As a result, the aperture ratio as measured from the voltage value was 17%.

The block error rate following recording was measured overall; as a result, a value of 2.5% was obtained. Meanwhile, the jitter of the recorded marks was 8.5%, a value that departed from the DVD Book standard. It is inferred that the jitter increased as a result of the size of the LPP interfering with the minimum marks.

Embodiments and examples of the present invention were described above; however, it goes without saying that the scope of the present invention is not restricted by these descriptions.

Industrial Applicability

The optical information recording medium of the present invention can be used as a highly reliable recording medium in recording media used in computers and recording media used to record music or video.

What is claimed is:

1. A disc-form optical information recording medium which has meandering grooves and lands and marks with minimum length of 0.4 μm are supposed to be made in the groves for recording information, and the recording and playback of information are performed by means of a light which tracks on the grooves, said optical information recording medium further having embossed pits (land pre-pits) that are formed in the lands beforehand, wherein the maximum length a in a said land pre-pits is less than 0.4 μm for all said land pre-pits, and the relationship between said maximum length a and the minimum length b of the same land pre-pit is such that a>b>0.5×a for all land pre pits.

2. A disc-form optical information recording medium according to the claim 1, wherein the maximum length a in one said land pre-pit is 0.2 μm or more for all said land pre-pits.

* * * * *